Oct. 14, 1969 P. F. T. C. STILLWELL 3,472,959

EMBATTLED SCANNING OF DOCUMENTS

Filed Aug. 10, 1966

INVENTOR.
PETER F. T.C. STILLWELL

BY Anthony D. Cennamo

ATTORNEY

United States Patent Office 3,472,959

Patented Oct. 14, 1969

3,472,959

EMBATTLED SCANNING OF DOCUMENTS

Peter F. T. C. Stillwell, Crookham Village, Aldershot, England, assignor to Xerox Corporation, Rochester, N.Y., a corporation of New York Filed Aug. 10, 1966, Ser. No. 571,541

Claims priority, application Great Britain, June 15, 1966, 26,807/66

Int. Cl. H04n 3/16

U.S. Cl. 178—7.7 1 Claim

ABSTRACT OF THE DISCLOSURE

An image exploration device for use in graphic communication systems. Contrary to the normal scanning directly across a document or the like, the beam alternately scans portions of adjacent lines of data in a square wave pattern, a predetermined number of binary digits in each segment. The scan beam would be alternately moved vertically and horizontally the predetermined number of elements for the entire length of the scan.

Figure 1:
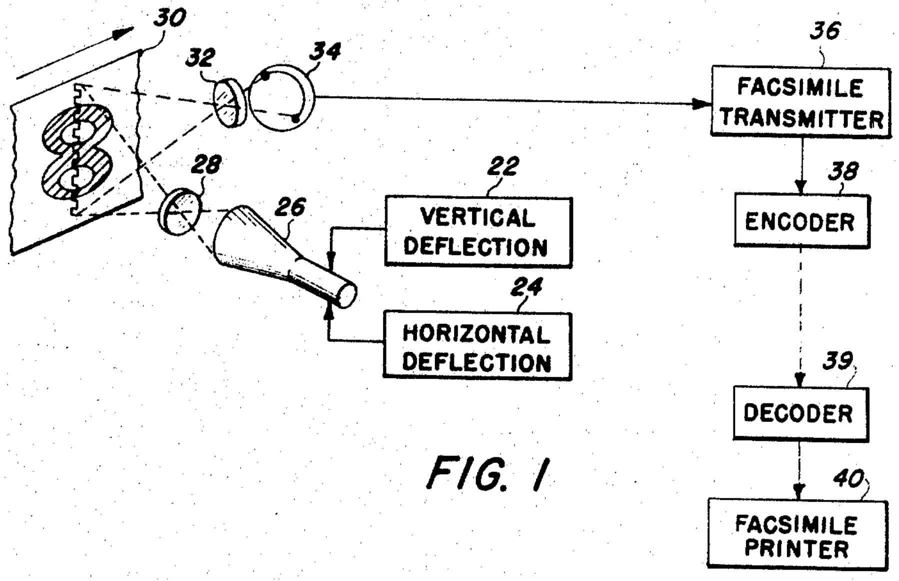

This invention relates to graphic communication systems and, more particularly, to improved methods and apparatus for use in an image exploration device employed in such systems.

As is known in a normal facsimile system, a document to be transmitted is scanned at a transmitting station to convert information on the document into a series of electrical signals. These video signals or carrier modulated signals corresponding thereto are then coupled to the input of a communication link interconnecting the transmitter with a receiver. At the receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that the lines of typing actually occupy considerably less than half the vertical dimension of the letter, the rest of this dimension being blank and corresponding to spaces between lines as well as blank spaces at the top and bottom of the letter. In a conventional facsimile system, all parts of such a letter are normally scanned at a uniform rate. Assuming transmission over an ordinary telephone line having a bandwidth in the order of three kilocycles, it may take in the order of six to fifteen minutes to transmit an ordinary letter with a reasonable resolution. Considering the cost of the telephone service, such long transmission times become a serious limitation on the economic usefulness of facsimile equipment.

The signal redundancy inherent in facsimile systems due, for example, to the margins and spacing between paragraphs of a letter and the attendant increased transmission cost, have led to the development of various coding techniques to reduce such redundancy, thereby eliminating the wasted transmission time. One such coding technique is known as run length coding in which binary numbers corresponding to various blocks of video data are sent rather than the usual facsimile signals. In such a system, a binary number of relatively few bits may be sent in lieu of a larger block of video data.

In a constant scan rate facsimile system, an optimum encoding method is one in which the contents of any one of all the permissable lines can be encoded into a minimum number of bits. Since the document rate and line scanning rate are generally fixed, a scan made parallel to the data printed on the page will sometimes be made through complete lines of print, while at other times, a scan will be made through a completely blank line. Normal documents have a rectilinear format in which the lines of data run horizontally across the page and are separated by blank gaps. In such a system, therefore, relatively long periods of transmission time will be taken with little or no information being transmitted. Thus, the system must be capable of transmitting at the maximum binary bit rate of the output information. When so designed for the highest bit rate, the system is therefore over-designed for the lowest bit rate.

One prior art solution designed to cope with the existence of large blank areas on a document has been to include such an encoding method for reducing signal redundancy plus provisions for line skipping. That is, as blank areas are detected during the scanning of a dicument, like the blank areas at the top and bottom of a page as well as the blank areas between the typed lines, such areas would be advanced quickly past the scanning station without scanning for information.

Such provisions are necessarily complex and expensive as both the transmitting and receiving apparatus must be similarly equipped. In a low cost facsimile system, such apparatus has proved to be unduly expensive and therefore undersirable.

It is, accordingly, an object of the present invention to provide methods and apparatus for averaging the amount of information contained in each scan of a raster type sweep of an image scanning device in a graphic communication transmitter.

It is another object of the present invention to provide methods and apparatus for increasing the transmission efficiency of a facsimile transmission system.

It is another object of the present invention to provide methods and apparatus for averaging the information content of subintervals of a message transmission time.

It is another object of the present invention to provide methods and apparatus for reducing the operating costs of transmitting facsimile data streams that include long periods of redundant information.

In accomplishing the above objects, the invention provides novel methods and apparatus for averaging the amount of information obtained from successive scans in a raster type sweep. In contradistinction to the normal scanning directly across a document in a facsimile system, the invention discloses that the beam alternately scans portions of adjacent lines of data in a square wave pattern, a predetermined number of bits in each segment. The scan beam would be alternately moved vertically and horizontally the predetermined number of elements for the entire length of the scan. Utilizing a square wave or embattled type of scan, in accordance with the invention, increases the length of black and white information runs which facilitates compression as with the aforementioned run length encoding technique, for example.

Figure 2:
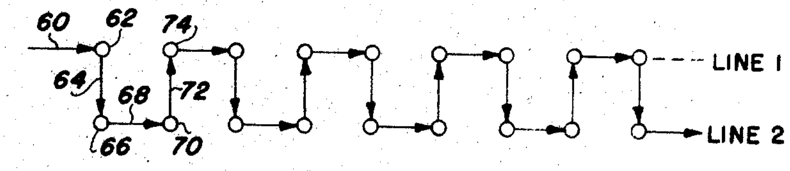

For a more complete understanding of the invention, as well as other objects and further features thereof, reference may be had to the following detailed description in conjunction with the drawings wherein:

FIG. 1 is a pictorial representation of a facsimile system embodying the principles of the present invention; and FIG. 2 illustrates a path traced by image exploring rays scanning a document scanned according to the preferred embodiment of the principles of the present invention.

Referring now to FIG. 1, there is shown a facsimile system utilizing the principles of the present invention. In a first aspect of the invention, a document 30 is selectively advanced by means not shown in the direction of the arrow transverse a scanning station including, for example, the field of scan of a beam of light emitted from cathode ray tube 26. Cathode ray tube 26, operable as a flying spot scanner, is arranged to be driven by vertical and horizontal deflection circuits 22 and 24, respectively. The vertical deflection circuit 22 could, for example, comprise a conventional square wave trigger circuit. With the normal sawtooth horizontal deflection waveform for deflecting the cathode ray beam across the width of the tube as generated by horizontal deflection circuit 24, the resultant scan beam would trace a square wave pattern on the face of the tube 26. The beam of light rays emitted from the face of the cathode ray tube 26 is focused onto document 30 by means of lens 28.

The light reflected from document 30 is not continuous in that the reflected light will be brighter where no black information was detected in the path of the impinging scan beam rays. Lens 32 focuses the reflected rays of light onto a detector 34, for example a phototube, which converts the information modulated light rays into electrical signals representative of the information on the document. The output from phototube 34 is coupled to any facsimile transmitter 36 known in the art, which would include the necessary circuits for converting the resultant analog signals to digital signals, as well as synchronization and time base provisions. The signals, now in digital form, are encoded by encoder 38, as for example, the preferred run length encoder hereinbefore mentioned, for reducing the information redundancy in the electrical signals. Such encoded information is then transmitted to a facsimile receiver of any known type by any means known in the art. The signals are decompressed by decoder 39 to reconstruct the original signal waveform for operation by printer 40.

The path of the embattled scan beam rays is seen in FIG. 1 to alternate between two scan lines. The representation, however, of the scan in FIG. 1 is the path of the scan throughout the width of the document. The entire pattern as seen in the figure would not be seen at one time but would be traced continuously from one side of the document to the other in the pattern as shown. Successive like scans would be made on the document equivalent to a conventional rate of 135 lines per inch, for example. Thus, as the document is scanned, information will be detected by the variation in the light intensity by phototube 34 as representative of the information printed on the document 30.

The embodiment illustrated in FIG. 1 employs a cathode ray tube and associated vertical and horizontal deflection circuits for selective deflection of the electron beam and thus the impinging scanning rays. As a cathode ray beam is essentially inertialess, generation of the embattled scan is determined primarily by the energization of the deflection circuits by the proper input waveforms thereto. As a second embodiment, a mechanical scanner could be used for scanning both of two adjacent lines with detector means for each line, as by fiber optics, for example. It would be necessary, therefore, in one aspect, at the facsimile transmitter to provide a storage unit for storing the output data detected for each of the two scan lines. The information then could be interlaced by specific logic circuits to obtain the same effect as the actual scanning of the embattled scan form. In another aspect, two marking means could be utilized at the printer, without the need for such information interlace. The use of a cathode ray tube is, however, a preferred embodiment in that accurate scanning is possible in the embattled waveform by means of the input deflecting signal waveforms.

The output from phototube 34 is an electrical signal representation of the information detected on the scanned document 30. Such information is then fed to the rest of the facsimile transmitting circuitry 36 in preparation of transmission to a facsimile receiver 38. Of necessity, the scan at the printout receiver must be identical to the scan at the transmitter. As the scan beam detects information from two scan lines of data, the facsimile receiver must be similarly scanning in an embattled scan so that the printout document would be properly aligned with the scan at the scanner transmitter.

FIG. 2 is a representation of two scan lines on a document utilizing the principles of the invention with embattled scan. The scan commences from the left and in a horizontal direction to first detect binary bit 62. The scan then moves vertically downward one binary bit position to the next scan line for detection of binary bit 66. The scan would then move one bit position to the right, as indicated by arrow 68, to detect binary bit 70. The scan then moves one binary bit position vertically upward, as indicated by arrow 72 to detect binary bit 74. This scan continues, moving one bit position at a time, until the entire two lines of data are scanned.

For purposes of illustration, FIG. 2 has been shown to have a binary bit at each position; however, these bits may or may not exist depending upon the existence of the printed information scanned. The deflected beam may be moved more than one bit element at a time if it is shown that the smallest printed element on the document is larger than at least one bit element. Such a bit element is the smallest element that can be detected by a movement of the scan beam rays.

The averaging of the information obtained in the scanning of the document is important when the utilization of a transmission medium is a proportionally high cost to the total cost of the system. In such cases, then, decreasing the amount of information transmitted or to transmit such information in a shorter time, is a major factor.

Thus, signal redundancy inherent in the facsimile signals encourages the use of various encoding techniques to reduce the redundancy, thereby eliminating the wasted transmission time. An important effect realized by use of embattled scan is that the information from the document is obtained in increased lengths of black and white runs, which facilitates compression encoding. That is, scanning the width of a document by scanning two lines by the principles of embattled scan, effectively stretches the one scan width into a scan twice as long. The disclosed invention, therefore, allows for the use of such an optimum run length encoding method in which the contents of any one of all the permissable scan lines can be encoded into a minimum number of binary bits. Inasmuch as low cost facsimile systems only allow for fixed document feeding rates and line scanning rates, the averaging of the information for subsequent use by a run length encoder, for example, allows for more efficient use of the transmission medium upon which the encoded information is to be transmitted.

The beam can also be made to scan more than one information bit element on each straight line portion of the square wave. Some information bit elements in some of the line scan could be left out by one scan, to be scanned by a subsequent, interlaced, scan.

The scan length could be increased to cover more than two adjacent lines by scanning down the information bit elements on more than two adjacent lines and up the neighboring information bit elements on the same lines, moving along one bit element between consecutive vertical scans.

In the foregoing there has been disclosed improved methods and apparatus for optimizing the use of a facsimile scanning device for scanning in a square wave pattern in a facsimile transmission system. Thus, while the present invention, as to its objects and advantages, as described herein, has been described in specific embodiments thereof, they are understood to be illustrative only and not to be limiting. It is intended, therefore, to be limited only as is indicated by the scope of the appended claim.

What is claimed is:

1. The method of scanning selective elemental areas of a document or the like along a predetermined raster by projecting an exploring beam of light of predetermined size recurringly deflected in a sweep scan, comprising the steps of:

vertically deflecting said exploring beam of light at least one information bit element from a starting point on a first line, said information bit element being smaller than the smallest printed element on said document, horizontally deflecting said exploring beam of light at least one information bit element on a second adjacent line, and alternately deflecting said exploring beam of light at least one information bit element vertically and horizontally between two adjacent lines until the entire document width is scanned.

References Cited

UNITED STATES PATENTS

| | | | |
|---|---|---|---|
| 2,222,934 | 11/1940 | Blumlein | 178—6.8 |
| 2,911,463 | 11/1959 | Kretzmer | 178—6 |
| 3,215,773 | 11/1965 | Chatten et al. | 178—6.8 |
| 3,239,606 | 3/1966 | Chatten et al. | 178—7.2 |

ROBERT L. GRIFFIN, Primary Examiner

ROBERT L. RICHARDSON, Assistant Examiner

U.S. Cl. X.R.

178—7.1; 315—26